(12) United States Patent
Nickel

(10) Patent No.: US 12,448,606 B2
(45) Date of Patent: Oct. 21, 2025

(54) ASSAY FOR FGF2 SECRETION AND SIGNALING

(71) Applicant: Universitaet Heidelberg, Heidelberg (DE)

(72) Inventor: Walter Nickel, Schriesheim (DE)

(73) Assignee: Universität Heidelberg, Heidelberg (DE)

( * ) Notice: Subject to any disclaimer, the term of this patent is extended or adjusted under 35 U.S.C. 154(b) by 1008 days.

(21) Appl. No.: 17/143,282

(22) Filed: Jan. 7, 2021

(65) Prior Publication Data

US 2021/0130786 A1   May 6, 2021

Related U.S. Application Data

(63) Continuation-in-part of application No. 15/510,177, filed as application No. PCT/EP2015/073591 on Oct. 12, 2015, now abandoned.

(30) Foreign Application Priority Data

Oct. 10, 2014 (GB) ..................................... 1417961

(51) Int. Cl.
  *C12N 5/077*   (2010.01)
  *C07K 14/50*   (2006.01)
  *C40B 30/06*   (2006.01)
  *G01N 33/68*   (2006.01)
  *G01N 33/74*   (2006.01)

(52) U.S. Cl.
CPC .......... *C12N 5/0658* (2013.01); *C07K 14/503* (2013.01); *C40B 30/06* (2013.01); *G01N 33/68* (2013.01); *G01N 33/74* (2013.01)

(58) Field of Classification Search
None
See application file for complete search history.

(56) References Cited

U.S. PATENT DOCUMENTS

2004/0209246 A1   10/2004   Brothers et al.

FOREIGN PATENT DOCUMENTS

| | | |
|---|---|---|
| EP | 2535410 A1 | 12/2012 |
| JP | 2011126850 | 6/2011 |
| JP | 2011184392 | 9/2011 |
| WO | 2009096902 | 8/2009 |
| WO | 2009111087 | 9/2009 |
| WO | 2010144696 | 12/2010 |

OTHER PUBLICATIONS

Ahmed et al., FEBS Letters, 593:2162-2176, 2019.*
Okada et al., Molecular Neurobiology, 56:8203-8219, 2019.*
Pardo et al., EMBO J, 25: 3078-3088, 2006.*
Li et al., Biochem J., 452:139-145, 2013.*
Debiais et al., Experimental Cell Research, 297:235-246, 2004.*
Ling Zhang et al, "Propranolol inhibits angiogenesis via down-regulating the expression of vascular endothelial growth factor in hemangioma derived stem cell," Int J Clin Exp Pathol, vol. 7, No. 1, Dec. 15, 2013 (Dec. 15, 2013). pp. 48-55.
Francesca Riuzzi et al, "SIOOB Engages RAGE or bFGF/FGFRI in Myoblasts Depending on Its Own Concentration and Myoblast Density. Implications for Muscle Regeneration," PLOS ONE, vol. 7, No. 1, Jan. 20, 2012 (Jan. 20, 2012), p. e28700.
E Pestereva et al, "PPAR [gamma] agonists regulate the expression of sternness and differentiation genes in brain tumour stem cells," British Journal of Cancer, vol. 106, No. 10, Apr. 24, 2012 (Apr. 24, 2012), pp. 1702-1712.
Sandra G. Velleman et al, "Effects of glypican-1 on turkey skeletal muscle cell proliferation, differentiation and fibroblast growth factor 2 responsiveness," Development Growth and Differentiation., vol. 48, No. 4, May 1, 2006 (May 1, 2006), pp. 271-276.
Bugler B, Amalric F & Prats H, "Alternative initiation of translation determines cytoplasmic or nuclear localization of basic fibroblast growth factor," Molecular and Cellular Biology 11 pp. 573-577 (1991).
Ramasamy, et al., "Novel In Vitro Experimental Platform for High Throughput Analysis of the Effect of Drugs on Multiple Myeloma Cells and the Tumour Microenvironment In a Co-Culture Setting," Blood, 2010, vol. 116, No. 21, p. 432.
Flaberg, et al., "High-throughput live-cell imaging reveals differential inhibition of tumor cell proliferation by human fibroblasts," Int. Journal of Cancer, 2011, vol. 128, No. 21, p. 2793.
Fuijata et al, "Tumor-stromal interactions with direct cell contacts enhance proliferation of human pancreatic carcinoma cells," Cancer Science, 2009, vol. 100, No. 12, p. 2390.

\* cited by examiner

*Primary Examiner* — Marianne P Allen
(74) *Attorney, Agent, or Firm* — William Gray Mitchell

(57) ABSTRACT

A method for the identification of compounds modulating the biological activity of FGF2, the method comprising the use of target cells sensitive to the presence of FGF2 by obstructing proliferation, wherein the target cells constitutively express a first reporter in- the nucleus of living target cells.

8 Claims, 13 Drawing Sheets

ASSAY FOR FGF2 SECRETION AND SIGNALING

CROSS-REFERENCE TO RELATED APPLICATION

The present application is a Continuation application to U.S. Ser. No. 15/510,177 filed on Mar. 9, 2017, which is a U.S. national stage application of PCT/EP2015/073591, filed on Oct. 12, 2015 claiming priority to UK Patent Application No. GB 1417961.8 filed on Oct. 10, 2014. The aforementioned applications are hereby incorporated by reference in its entirety.

BACKGROUND OF THE INVENTION

Field of the Invention

The present invention relates to a method for the identification of FGF2 secretion and/or signaling and use of the method.

Brief Description of the Related Art

Growth factors belong to a group of proteins that stimulate the growth of specific tissues. Fibroblast growth factors (FGFs) are small polypeptide growth factors and belong to the family of growth factors. They share certain structural characteristics and most of them bind to heparin. Many FGFs contain signal peptides for secretion and are secreted into the extracellular matrix (EM). FGFs bind specific receptors and induce by their binding the activation of intracellular signal cascades.

Epithelial and tumor cells for instance produce FGF2 or basic FGF, which does not contain a signal sequence for secretion. A nuclear localization sequence has been reported upstream of the AUG start codon (Bugler et al., 1991, MCB 11, 4770-4777), although the role of nuclear localization remains unclear.

Ramasamy and colleagues (Blood, 2010, Vol. 116, No. 21, p. 432; British Journal of Hematology, 2012, 157, p. 564) describe an in-vitro experimental platform for high throughput analysis of the effect on multiple myeloma cells and the tumor microenvironment in a co-culture setting. They generated eGFP expressing multiple myeloma (MM) cells and other cancer derived cell lines expressing eGFP. The use of eGFP-MM cells allows flow cytometry analysis of cell cycle profile and apoptosis with no significant cellular contamination from co-cultured cells such as fibroblasts, osteoclasts or stromal cells derived from bone marrow aspirates of MM patients. Using cancer derived cell lines, the platform of Ramasamy and colleagues is not appropriate for detecting FGF2.

Flaberg et al. (Int. Journal of Cancer, 2011, Vol. 128, No. 21, p. 2793) teach a high-throughput system employing a lymph node metastasis derived cell line that is stably transfected with a constitutive CMV promotor driven eGFP. Other cancer derived cell lines were transfected with recombinant histone H2A-red fluorescent protein. However, the disclosed system is based on cancer cell line and for that reason not suitable for detecting FGF2 secretion.

Fuijata et al (Cancer Science, 2009, Vol. 100, No. 12, p. 2390) disclose a simplified direct co-culture system that is able to quantify populations of cancer cells in co-culture. They established three eGFP expressing pancreatic cancer cell lines and were able to quantify them reliable and reproducible whenever co-cultured with activated pancreatic stellate cells.

In particular, tumor cells express FGF2. Thus, inhibitors of FGF2 secretion and/or signaling seem to be potential targets for tumor therapy. Thus, there is a need for an assay allowing for instance high-throughput screens of compound libraries for effective inhibitors of FGF2. There is a need for an assay being capable of measuring a physiological response to the presence of FGF2.

SUMMARY OF THE INVENTION

The present disclosure provides a method for the identification of the presence of FGF2 secretion modulating compounds, the method comprising the steps of providing target cells which become apoptotic in the presence of FGF2, wherein the target cells constitutively express a first reporter exciting fluorescence at a first wavelength, wherein the first reporter is only expressed in the nucleus of living target cells; monitoring the amount of living target cells by determining the fluorescence of the first reporter; co-incubating the target cells with other cells or compounds; detecting the presence of DNA from apoptotic cells with a second reporter exciting fluorescence at a wavelength that differs from the wavelength of the first reporter; calculating the quotient of the second fluorescence versus the first fluorescence; identifying the presence of FGF2 from a change of the calculated quotient.

In a further aspect of the present invention, the first reporter is a first fluorescent protein.

It is further envisaged, that the second reporter is a second fluorescent protein.

In a further embodiment of the present invention, the absorption spectrum of the first and second fluorescent protein differ.

In a further aspect of the present invention, the target cells are co-incubated with known concentrations of FGF2 prior to step a to determine a relation between FGF2 concentration and an increase in DNA from apoptotic cells.

The method according to the present invention may further provide that FGF2 secretion from cells which are co-incubated with the target cells is inducible.

It is also envisaged that the FGF2 secreting cells are co-incubated for inducing FGF2 secretion with at least one compound selected from the group comprising peptides, proteins, nucleic acids, carbohydrates, antibodies, lipids, micelles, vesicles, synthetic molecules and polymers.

The method of the present invention may further comprise a step, wherein the co-incubated cells are selected from the group comprising tumor cells, endothelial cells, muscle cells, neural cells and fibroblasts.

It is also envisaged that additionally control cells are co-incubated with target cells in step c of claim 1, which are constitutively expressing a third reporter, wherein the control cells are insensitive to the presence of FGF2.

The method may further encompass providing target cells which are genetically modified cells derived from a neuroblastoma, wherein the target cells can be SK-N-MC cells.

In a further aspect of the present invention, members of a compound library are co-incubated with the target cells, with the members of the compound library being bound to at least one of metal particles, nanoparticles, or a solid phase and the member of the compound library are selected from the group comprising peptides, proteins, carbohydrates, antibodies, lipids, micelles, vesicles, synthetic or biological molecules and polymers.

The method of the present invention may further provide members of the compound library which are in solution.

It is also intended that the target cells are provided in multi-well plates, wherein each well is co-incubated with different cells or compounds for identifying FGF2 secretion modifying compounds.

In a further embodiment, the cells which have been co-incubated with the target cells are separated from the target cells by cell sorting, such as fluorescence activated cell sorting or magnetic cell sorting, and re-cultured for further approaches.

BRIEF DESCRIPTION OF THE FIGURES

For a more complete understanding of the present invention and the advantages thereof, reference is now made to the following description and the accompanying drawings, in which:

FIG. 11A shows the expression of ATP1A1 and GAP-DH as analyzed by Western blotting. FIG. 11B shows the effects of ATP1A1 and GAPDH knock downs on the quotient of apoptotic to living cells.

FIG. 12A shows the expression of Tec kinase and GAP-DH as analyzed by Western blotting. FIG. 12B shows the effects of Tec kinase and GAPDH knock downs on the quotient of apoptotic to living cells.

DETAILED DESCRIPTION OF THE INVENTION

Figure 1:
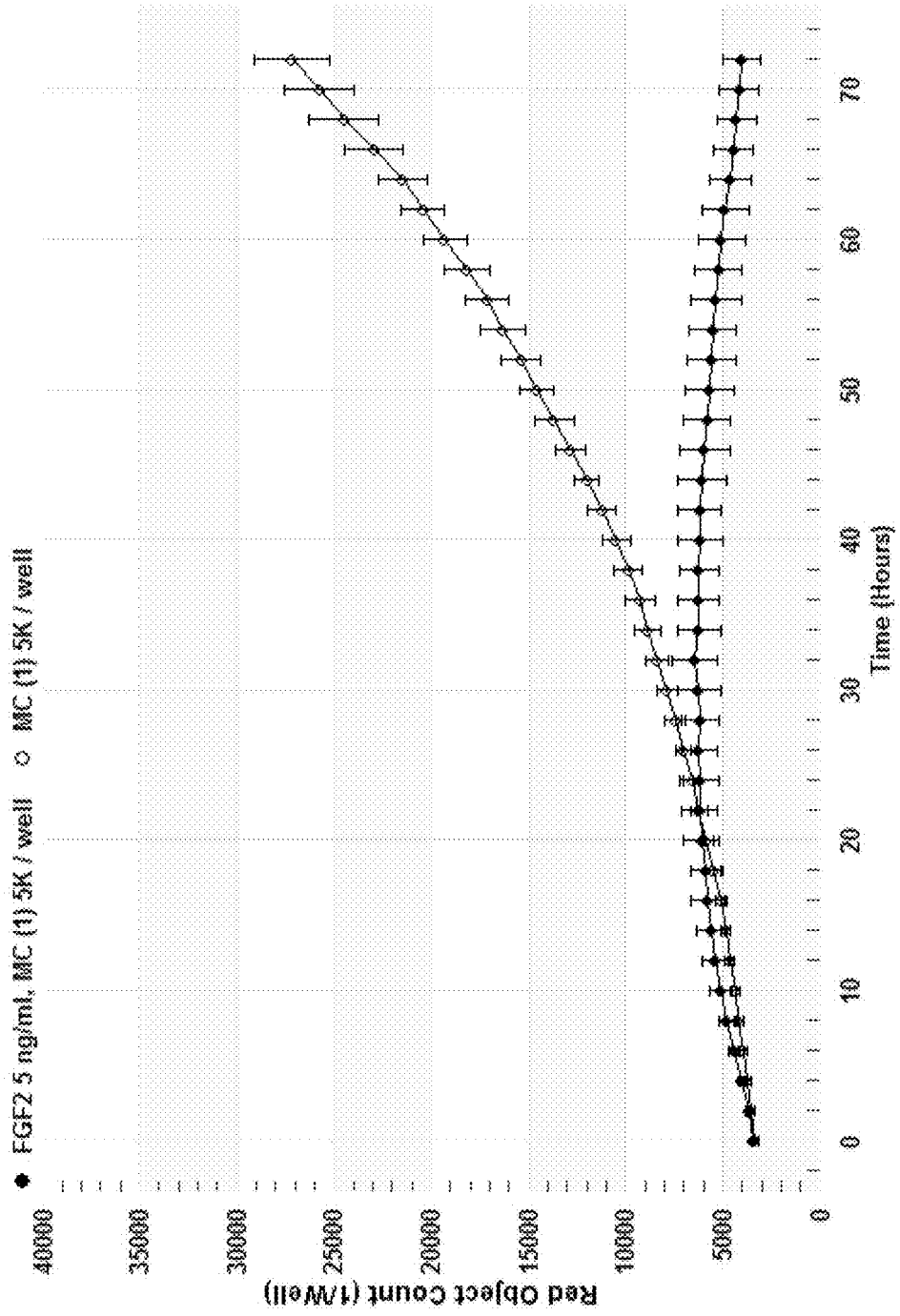
FIG. 1 is a graph showing proliferation of target cells expressing constitutively a fluorescent protein in the presence and absence of FGF2.

The present disclosure provides a method for the identification of compounds modulating the secretion of FGF2 or FGF2 signaling by employing experiments distinguishing the absence versus presence of recombinant FGF2.

Modulation of FGF2 secretion according to the present disclosure refers to the activation or suppression of FGF2 signaling. In this context, modulation of FGF2 secretion may also refer to influencing the nature or the character of FGF2 and its secretion, either by affecting the level of FGF2 intra- or extracellular, which is still developing or maturing or by blocking secretion of FGF2 into the EM or by altering its molecular signaling capacity by blocking its binding to receptors. The disclosed assay might also reveal compounds that block downstream signaling in target cells, like SK-N-MC cells. However, the disclosed methods provide besides identification and thus quantification of FGF2 that is present a tool allowing qualitative analysis. If the target cells will be unaffected by co-incubation with other cells or compounds, the addition of recombinant FGF2 allows to determine whether the signaling pathway of the target cells is affected. If recombinant FGF2 is able to induce the target cells to proliferate, it becomes obvious that the before observed lack of proliferation of the target cells is not related to the signaling pathways in the target cells. In case that the addition of recombinant FGF2 will not be able to affect proliferation of the target cells, the compound or co-incubated cells will affect the cellular machinery of the target cells or the recombinant FGF2 directly.

According to the present disclosure, target cells refer to a cell line, which is sensitive to the presence of FGF2 within the meaning that the target cells will die as a consequence from the presence of FGF2. The target cells become apoptotic caused by a shut-down of cell proliferation and subsequent cell death. The target cells according to the present invention are thus a kind of a sensor for the presence of FGF2. Thus, the presence of FGF2 can be determined by measuring or determining an increase of apoptotic target cells. It is obvious for a skilled person that any cell line which becomes apoptotic in the presence or by the presence of FGF2 may serve as target cells or the "cellular sensor" of the present invention. Methods for determining whether cells are sensitive to the presence of FGF2 by becoming apoptotic refers to common knowledge of a skilled person.

FGF2 secreting cells refers to a cell line, which is able to secret FGF2 and control cells represent a cell line, which is insensitive to the presence of FGF2.

The term 'control cells' refers to cells which are insensitive to the presence of FGF2 so that their proliferation is not affected by FGF2. Control cells may be used in separate co-incubations to control that the identification of FGF2 in co-incubations is FGF2 specific, because the control cells will remain unaffected in the presence of FGF2.

A reporter within the meaning of the present invention shall be understood as a gene encoding a protein, which can be used as a reporter like a fluorescent protein. The target cells may have been stably transfected with such a gene of a first reporter, so that it will be constitutively expressed. The control cells may have been stably transfected with such a gene of a different second reporter, so that it will be constitutively expressed.

A compound that can be co-incubated with the target cells refers to any biological or synthetic compound that may have an influence on FGF2 secretion of co-incubated cells or without them on pathways of the target cells. The compounds shall be tested with respect to their influence on FGF2 secretion.

A compound library according to the present disclosure refers to a collection of chemicals, further called compounds, and their related information. Compounds are selected from the group comprising peptides, proteins, carbohydrates, antibodies, lipids, micelles, vesicles, synthetic molecules and polymers.

A "solid phase" to which compounds to be investigated can be covalently or non-covalently attached refers to, but is not restricted to, a column, a matrix, beads, glass including modified or functionalized glass, synthetic membranes, silica or silica-based materials including silicon and modified silicon, plastics (comprising polypropylene, polyethylene, polystyrene and copolymers of styrene and other materials, acrylics, polybutylene, polyurethanes etc.), nylon or nitrocellulose, resins, polysaccharides, carbon as well as inorganic glasses, metals, nanoparticles, and plastics. Thus, microtiter plates are also within the scope of a solid phase according to the present disclosure.

It is to be noted that the present invention is aiming at the identification of compounds that inhibit either FGF2 secretion or FGF2-dependent signaling in a wide range of cell types by measuring or determining the fluorescence of a first and second reporter in SN-K-MC target cells. There is no direct measurement of FGF2, but the target cells becoming apoptotic in the presence of FGF2 and the resulting decrease of living target cells can be used for identifying the presence of FGF2 by the effect FGF2 has on the target cells. A person having ordinary skill in the art will clearly take from the teaching of the present invention that there is a correlation between a decrease of living target cells and the presence of FGF2 in the medium in which the target cells are incubated.

The method according to the invention may be used very efficiently for the identification of cell growth disorders, wherein cell growth disorders comprise tumor or cancer associated diseases like leukemia. The tumor disease can be a disease selected from the group comprising tumors of the ear-nose-throat region, comprising tumors of the inner nose, nasal sinus, nasopharynx, lips, oral cavity, oropharynx, larynx, hypopharynx, ear, salivary glands, and paragangliomas, tumors of the lungs comprising non-parvicellular bronchial carcinomas, parvicel-lular bronchial carcinomas, tumors of the mediastinum, tumors of the gastrointestinal tract, comprising tumors of the esophagus, stomach, pancreas, liver, gallbladder and biliary tract, small intestine, colon and rectal carcinomas and anal carcinomas, urogenital tumors comprising tumors of the kidneys, ureter, bladder, prostate gland, urethra, penis and testicles, gynecological tumors comprising tumors of the cervix, vagina, vulva, uterine cancer, malignant trophoblast disease, ovarial carcinoma, tumors of the uterine tube (Tuba Faloppii), tumors of the abdominal cavity, mammary carcinomas, tumors of the endocrine organs, comprising tumors of the thyroid, parathyroid, adrenal cortex, endocrine pancreas tumors, carcinoid tumors and carcinoid syndrome, multiple endocrine neoplasias, bone and soft-tissue sarcomas, mesotheliomas, skin tumors, melanomas comprising cutaneous and intraocular melanomas, tumors of the central nervous system, tumors during infancy, comprising retinoblastoma, Wilms tumor, neurofibromatosis, neuroblastoma, Ewing sarcoma tumor family, rhabdomyosarcoma, lymphomas comprising non-Hodgkin lymphomas, cutaneous T cell lymphomas, primary lymphomas of the central nervous system, morbus Hodgkin, leukemias comprising acute leukemias, chronic myeloid and lymphatic leukemias, plasma cell neoplasms, myelodysplasia syndromes, paraneoplastic syndromes, metastases with unknown primary tumor (CUP syndrome) , peritoneal carcinomatosis, immunosuppression-related malignancy comprising AIDS-related malignancy such as Kaposi sarcoma, AIDS-associated lymphomas, AIDS-associated lymphomas of the central nervous system, AIDS-associated morbus Hodgkin and AIDS-associated anogenital tumors, transplantation-related malignancy, metastasized tumors comprising brain metastases, lung metastases, liver metastases, bone metastases, pleural and pericardial metastases, and malignant ascites.

The invention will be described by experiments and figures. It is obvious for a person ordinary skilled in the art that the invention is not limited to the disclosed embodiments.

SK-N-MC cells, a human neuro-epithilioma cell line (ATCC HTB-10), were stably transduced with a construct carrying the red fluorescent protein mCherry fused to a nuclear localization signal (mCherry-NLS). The cell line used in the shown experiments is derived from a single clone that was isolated by FACS resulting in homogenous red fluorescence in the nuclei of this cell population. Using an Essen Biosciences Incucyte Zoom LED microscope, the proliferation of these cells can be monitored in a quantitative manner for an almost unlimited period of time.

Since SK-N-MC cells are known to respond to FGF2 by a shutdown of cell proliferation, they can be used to sense FGF2 in the extracellular space. For example, as a proof of principle, this property of FGF2 can be demonstrated by challenging SK-N-MC cells with recombinant FGF2 (25 ng/ml). Furthermore, we can make use of this phenomenon to monitor FGF2 secretion from a second cell line based on co-cultivation of SK-N-MC cells with for example Hela S3 cells (ATCC CCL-2.2) expressing FGF2 in a doxycycline-dependent manner. The skilled artisan is familiar with other inducible systems comparable to doxycycline-dependent induction of gene expression. Examples are the SparQ Cumate Switch System (comp. https://systembio.com/shop/pcdh-cuo-mcs-eflα-cymr-t2a-puro/)) and the Gene Switch system (comp. https://www. thermofisher.com/de/de/home/references/protocols/proteins-expression-isolation-and-analysis/protein-expression-protocol/inducible-protein-expression- inducible-protein-expression-using-geneswitch-technology.html#intro).

For experiments using recombinant FGF2, SK-N-MC cells expressing mCherry-NLS were cultivated in 96 well plates (Corning) at a starting density of 5000 cells per well. Cells were grown in Minimum Essential Medium Eagle alpha modified (α-MEM, Sigma) supplemented with 10% FCS, Penicillin (100 U/ml) and Streptomycin (100 µg/ml). Recombinant FGF2 (18 kDa form with N-terminal His-tag) was added at a final concentration of 25 ng/ml in α-MEM.

For co-culturing experiments, HeLa S3 cells expressing FGF2 were seeded at 1000 cells per well in 96 well plates (Corning) followed by the addition of doxycycline (1 µg/ml) to induce FGF2 expression and secretion. Following 48 hours of cultivation, SK-N-MC cells constitutively expressing mCherry-NLS were added at a density of 5000 cells per well. Cells were grown in α-MEM in an appropriate incubator at 5% $CO_2$ and 37° C.

To specifically monitor cell proliferation of SK-N-MC cells labelled with mCherry-NLS, live imaging was performed using an Essen Biosciences Incucyte Zoom Instrument along with a statistical analysis of three technical replicates for each experimental condition. Images were acquired every 2 hours with four images taken per well for each time point. This system allows for an absolute quantification of fluorescent nuclei and, therefore, a direct measurement of cell proliferation over time.

Target cells, like SK-N-MC cells for instance, which express constitutively a first reporter in the nuclei of living cells will become apoptotic in the presence of FGF2. A caspase 3/7 assay can be used to detect DNA of apoptotic cells with a second reporter, e.g., a green fluorescent dye. Theoretically, FGF2 should result in a decrease of the first reporter, e.g., red nuclei of living cells, and an increase of a second reporter, e.g., green color, caused by an increasing number of apoptotic cells among SK-N-MC cells with red labelled nuclei.

By calculating the ratio of green versus red fluorescence resulting from the first versus second reporter, it is possible to get a more precise result or relation between the FGF2 concentration change in the proliferation of the target cells. Corresponding results are shown in FIGS. 7 to 10. FGF2 was titrated and added directly or FGF2 secretion was induced in co-incubated cells by adding for instance doxycycline to HeLa cells carrying a doxycycline-inducible FGF2 gene.

The calculation of the quotient of the determined first reporter like red fluorescent nuclei and determined second reporter, like green fluorescence caused by the DNA of apoptotic cells resulted in a more robust results reflecting the effect of the respective concentration of FGF2 on the proliferation of the target cells.

A key approach in the identification of molecular components involved in FGF2 secretion has been a genome-wide RNAi screen that led to the identification of Tec kinase as a regulatory component of FGF2 secretion (Nickel et al., 2011, Traffic 12, 799-805,32; Ebert, et al., 2010), Traffic 11, 813-82). In addition to Tec kinase, this screen also revealed ATP1A1 as a gene product whose down-regulation causes a substantial drop in FGF2 secretion efficiency.

Knock-downs of ATP1A1 and Tec-kinase were done in the FGF2 expressing cell line followed by quantifying FGF2 secretion using the disclosed assay employing SK-N-MC cells.

The instant invention discloses an assay employing a target cell line sensitive to FGF2 secretion that can be used to quantify the concentration of FGF2 and allows to determine whether inhibition of FGF2 secretion is caused in the FGF2 donor cells or the target cell line. Thus, it is not only possible to identify FGF2 secretion and/or signaling effecting molecules, but also to get information about their mode of action. Using the method utilizing one or two fluorescent parameters allows for a precise determination of presence and—if a calibration took place prior to measuring for FGF2—concentration of FGF2.

FIG. 1 shows a target cell line, which is sensitive to the presence of FGF2. The cells express constitutively a red fluorescent protein coupled to a nuclear localization signal, so that the nuclei of living cells appear to be red. The presence of recombinant FGF2 (5 ng/ml) results in a reduction of cells. The target cells are neuroblastoma cells (Neuroblastoma SK-N-MC) that were stably transfected with a red fluorescent protein. In the absence of recombinant FGF2 the cells proliferate normally.

Figure 2:
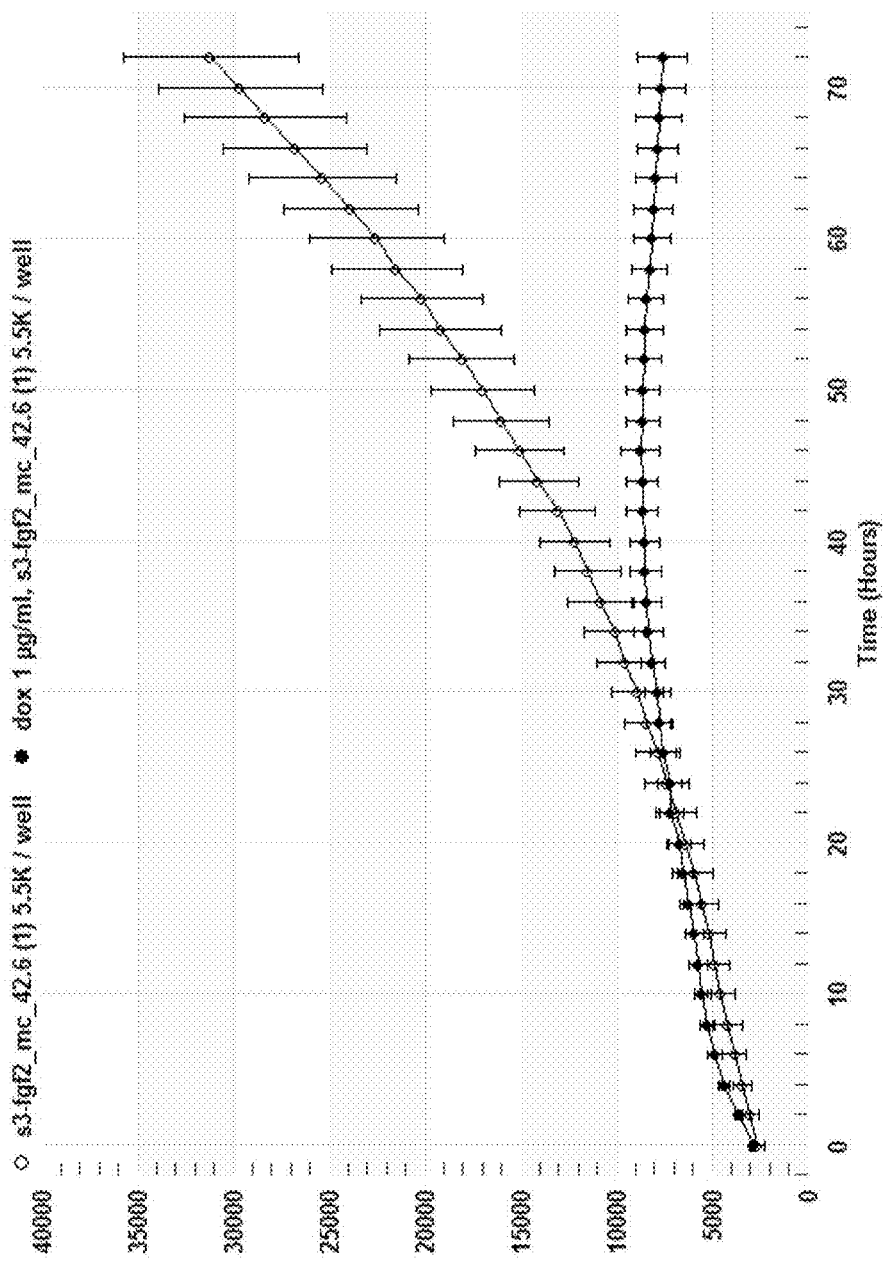
FIG. 2 is a graph showing proliferation of target cells expressing constitutively a fluorescent reporter co-incubated with HeLa cells secreting FGF2 inducible with doxycycline.

FIG. 2 shows the results of co-incubating target cells expressing constitutively a RED fluorescent reporter with HeLa cells secreting FGF2 inducible by doxycycline. The upper line in FIG. 1 shows co-incubation of the cells without inducing FGF2 secretion by doxycycline. After induction of FGF2 secretion by addition of doxycycline a massive reduction of the number of target cells can be observed.

Figure 3:
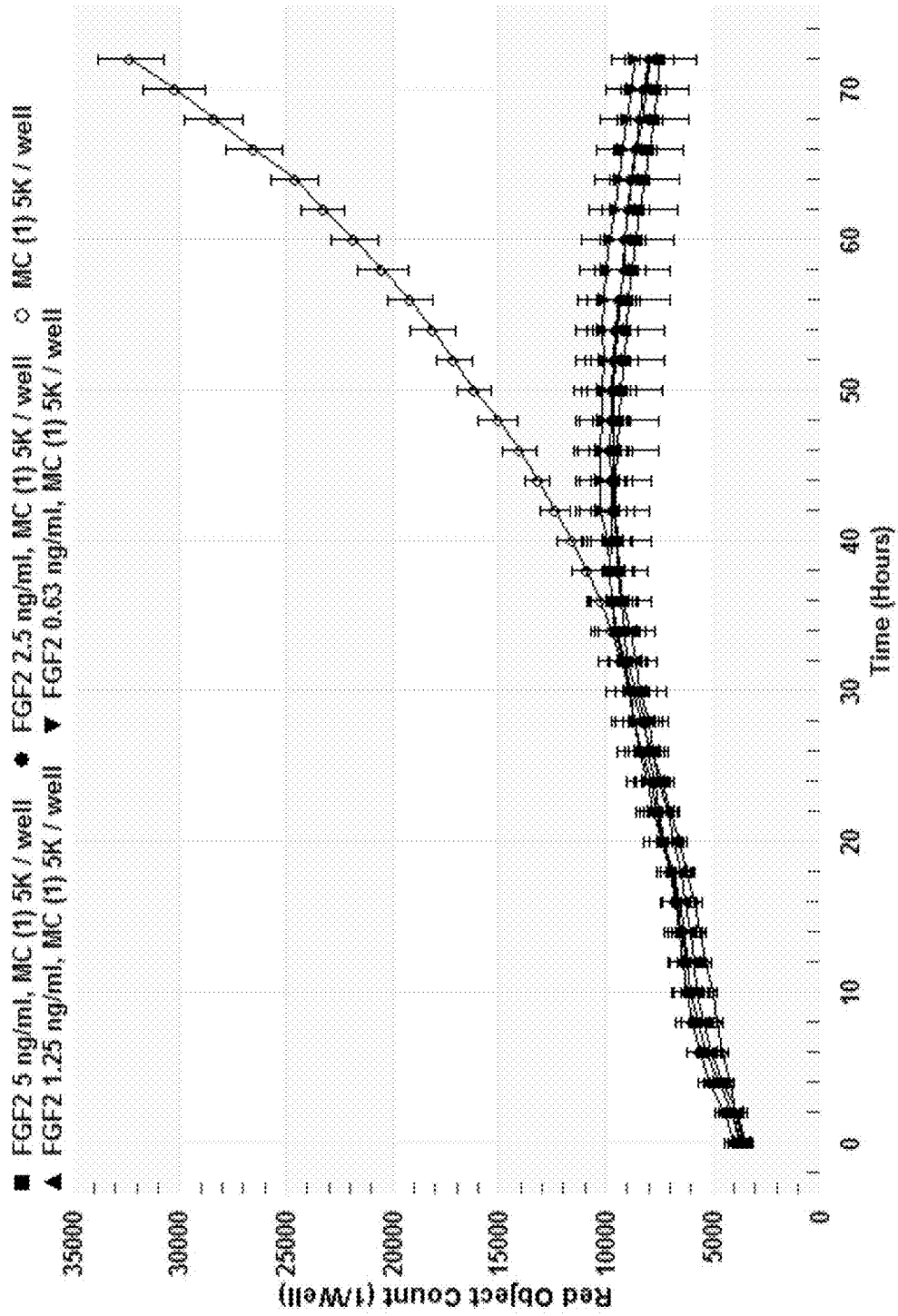
FIGS. 3 and 4 are graphs illustrating the effect of different FGF2 concentrations on SK-N-MC cell proliferation.
Figure 4:
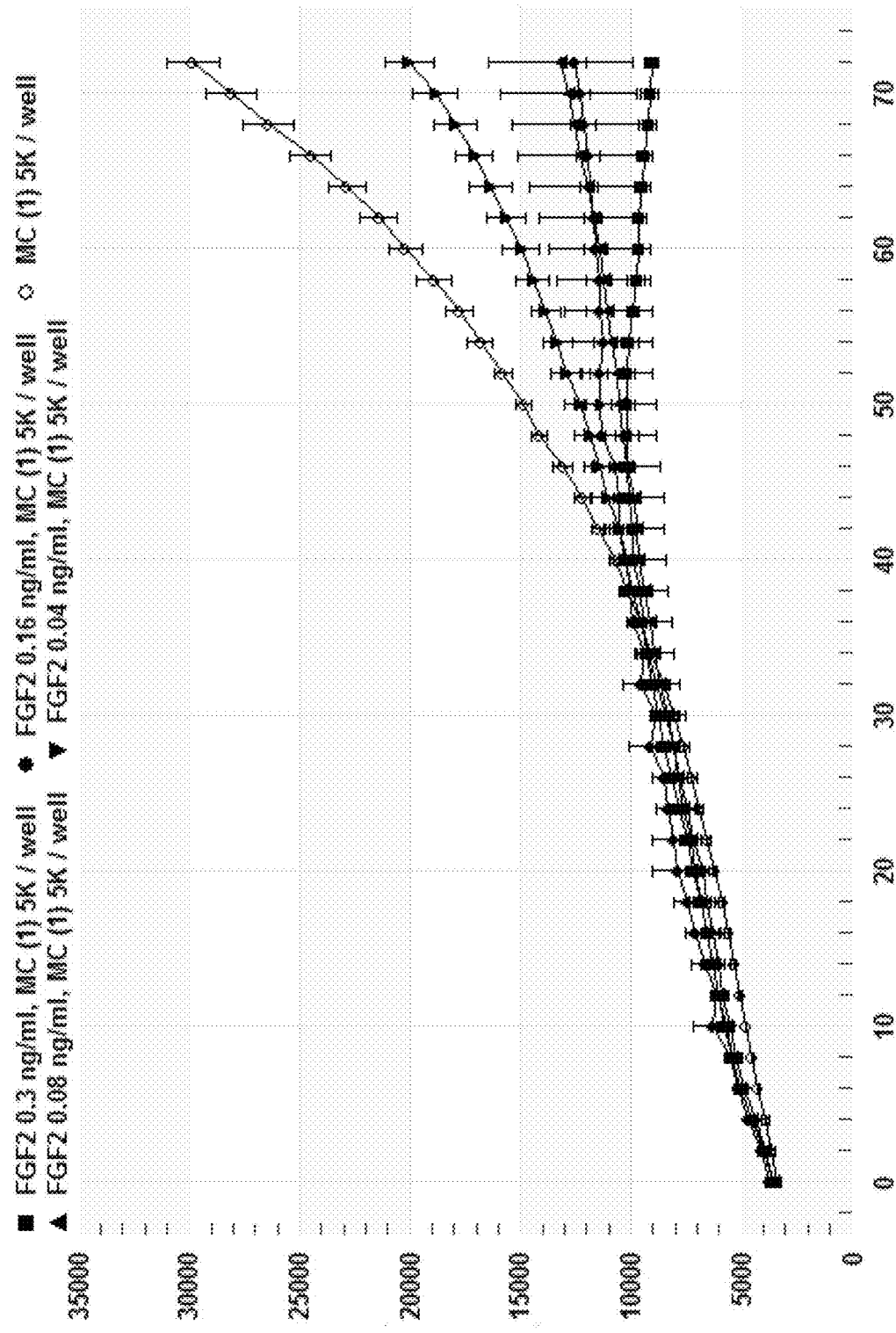

FIGS. 3 and 4 show effects of different concentrations of FGF2 on the cell growth of the target cell line sensitive to the presence of FGF2. It can be observed that the growth curves depend on the respective concentration of FGF2, so that less FGF2 results in a better growth of the cells.

Figure 5:
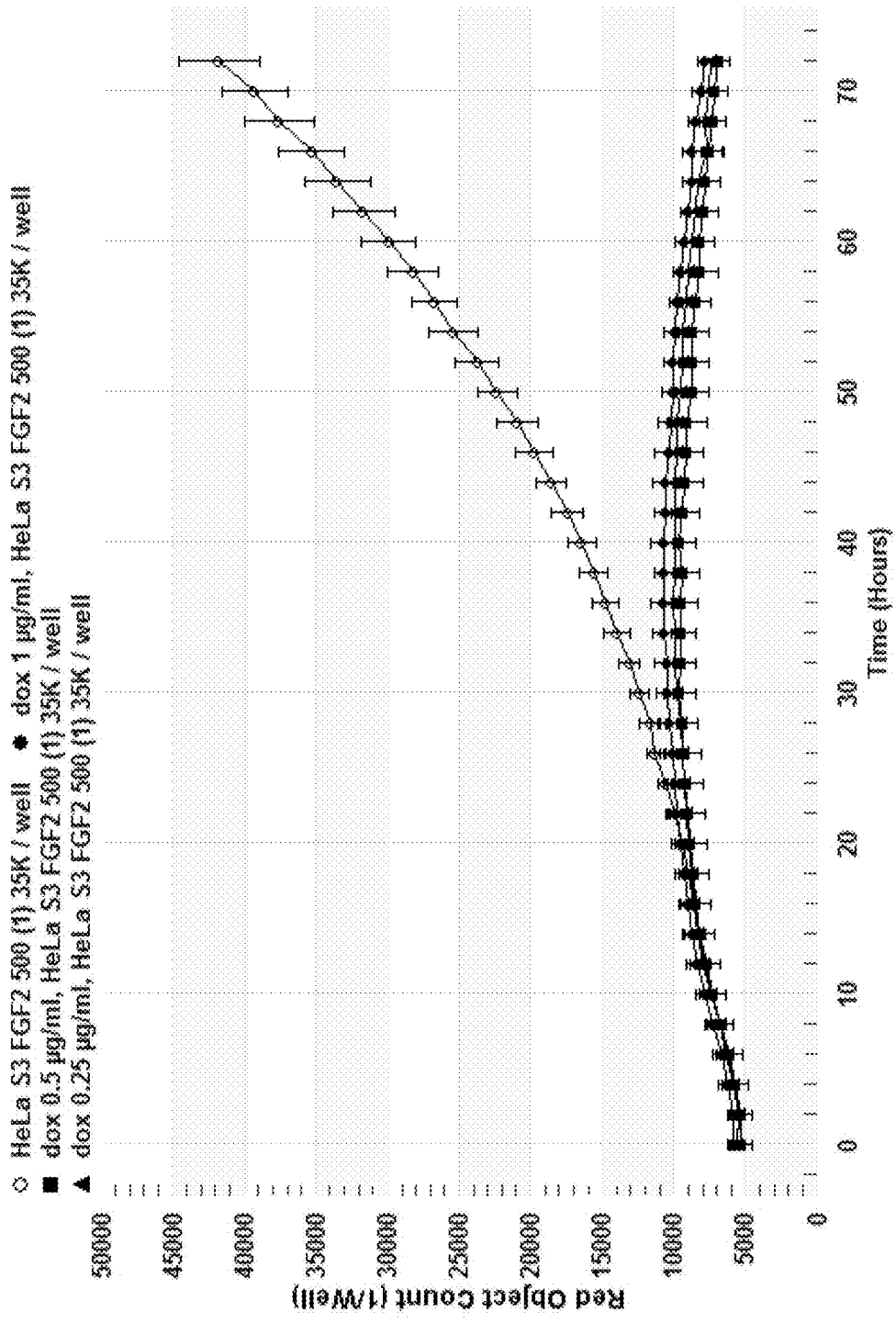
FIGS. 5 and 6 are graphs illustrating the effect of different secreted FGF2 concentrations on SK-N-MC cells co-incubated with HeLa cells secreting FGF2 inducible with doxycycline.
Figure 6:
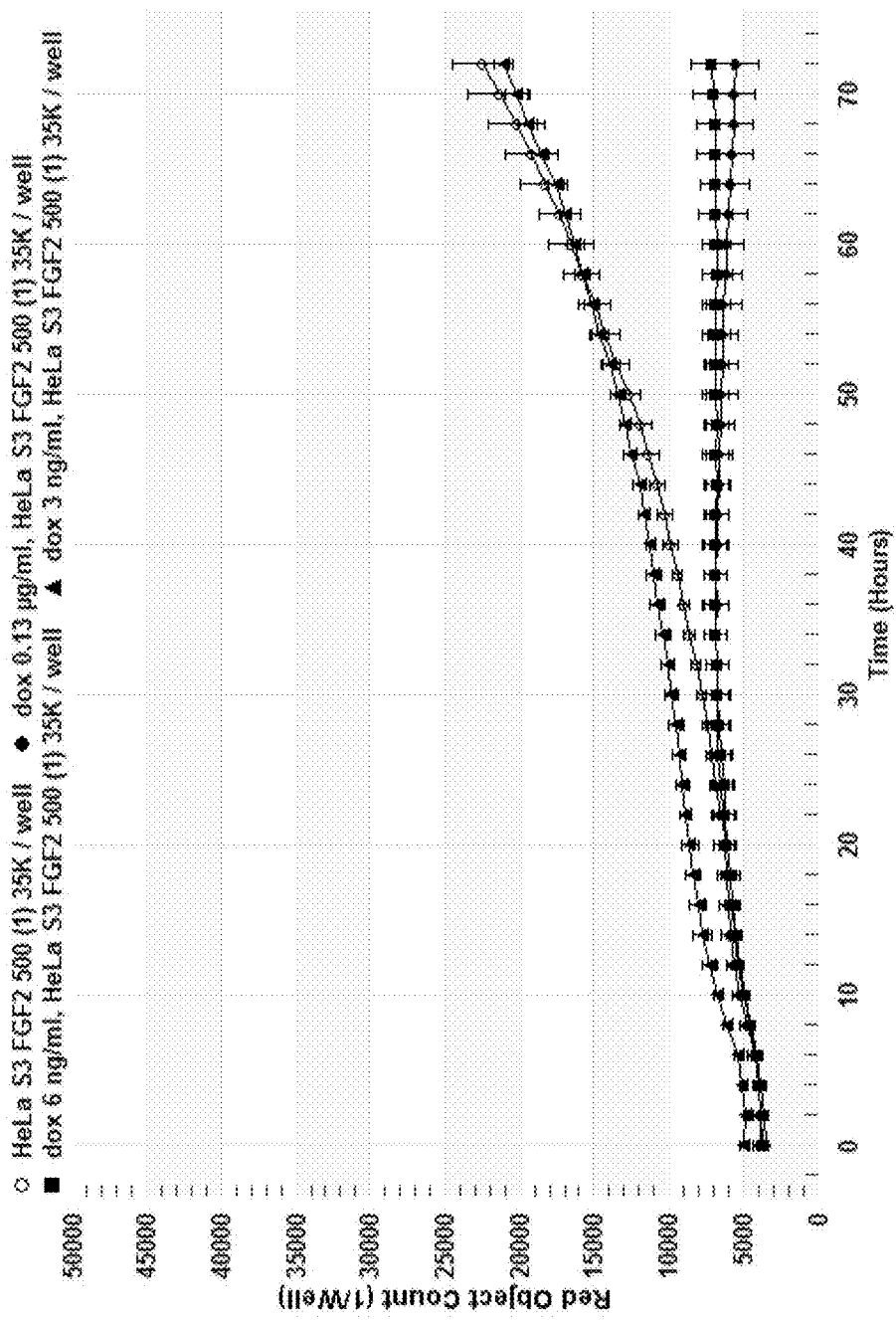

FIGS. 5 and 6 show effects of adding different amounts of doxycycline to the medium in order to induce FGF2 secretion by co-incubated HeLa cells. Again, the amount of induced FGF2 secretion by the addition of doxycycline (dox) effect the proliferation of the target cells in a way that the more FGF2 is secreted the less proliferation of target cells can be observed.

The results in FIGS. 3-6 show that the proliferation of the target cells is dose dependent with respect to the presence of FGF2 even if FGF2 secretion is the effect of adding different amounts of on inducer for FGF2 secretion. Thus, the assay seems to be surprisingly suitable to prepare calibrated growth curves so that a quantification of FGF2 concentrations will be possible.

Figure 7:
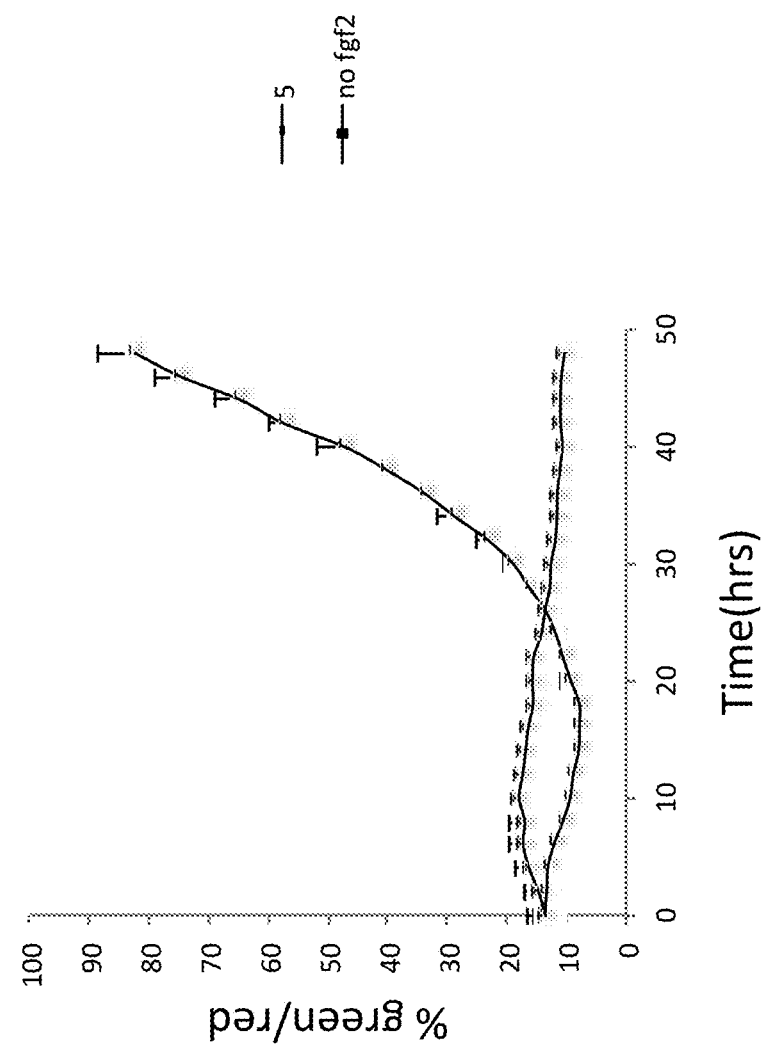
FIG. 7 is a graph of the quotient of red fluorescent nuclei and green fluorescence caused by apoptotic cells in the absence and presence of FGF2.

FIG. 7 shows the quotient of red fluorescent nuclei and green fluorescence caused by apoptotic cells in the absence and presence of FGF2. It has to be noted that the output of the results reverses the previously shown curves, because the induction of apoptosis by FGF2 will result in an increase of the quotient of green to red fluorescence.

Figure 8:
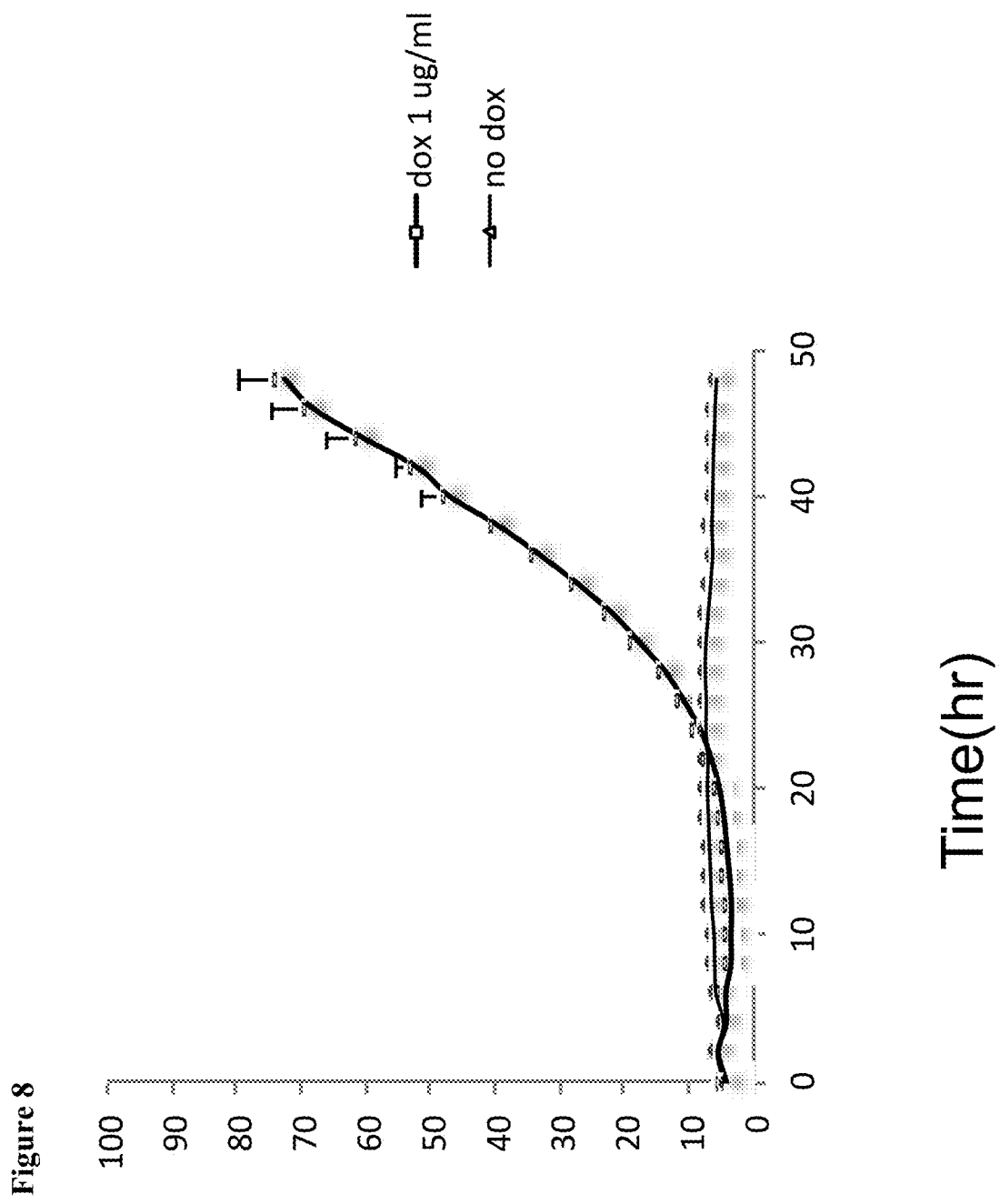
FIG. 8 is a graph of the quotient of red fluorescent nuclei and green fluorescence caused by apoptotic cells in the absence and presence of doxycycline induced FGF2 secretion.

FIG. 8 shows the quotient of red fluorescent nuclei and green fluorescence caused by apoptotic cells in the absence and presence of doxycycline induced FGF2 secretion. The quotient increases if doxycycline is added in a concentration of 1 µg/ml due to the increase of apoptotic cells.

Figure 9:
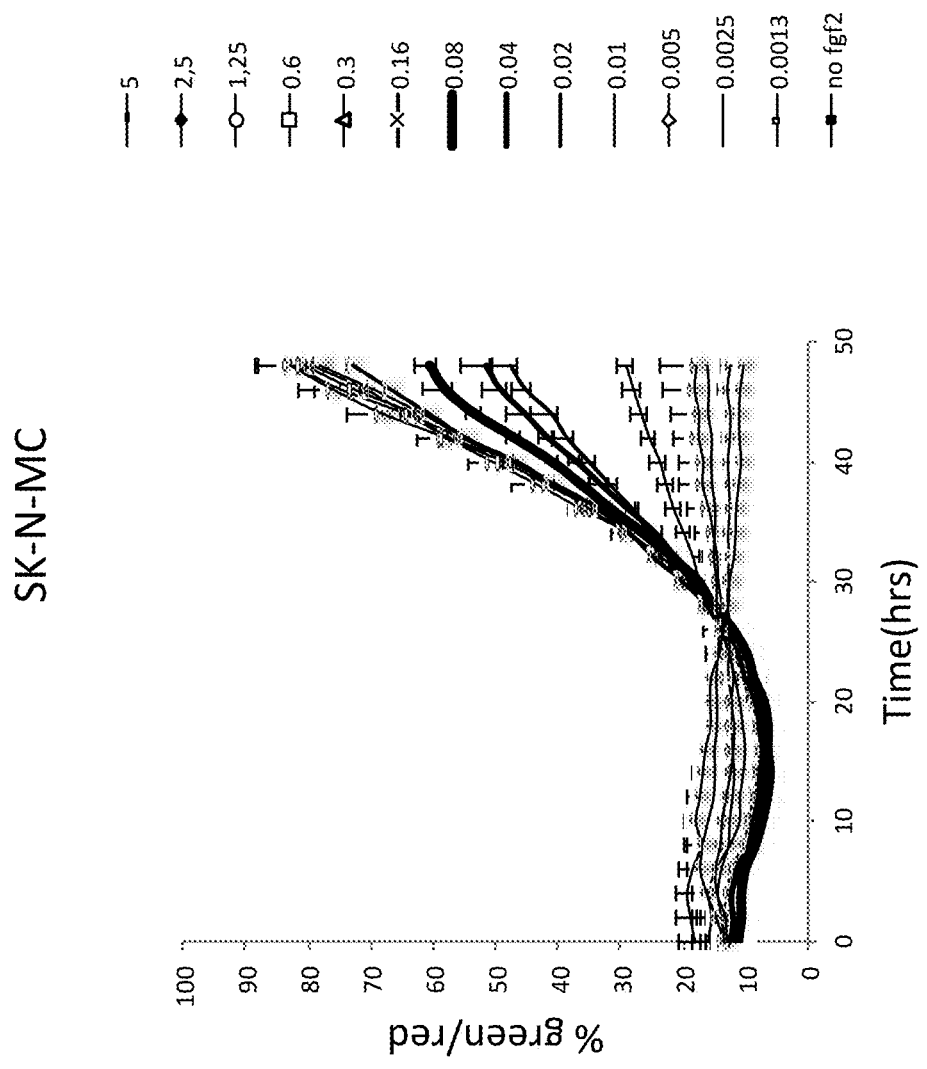
FIG. 9 is a graph showing the effect of different FGF2 concentrations on SK-N-MC cells on the quotient of red fluorescent nuclei and green fluorescence caused by apoptotic cells.

FIG. 9 shows the effect of different FGF2 concentrations on SK-N-MC cells on the quotient of red fluorescent nuclei and green fluorescence caused by apoptotic cells. The quotient is dose dependent and reflects the dose dependency more precisely than using only red fluorescence of nuclei of living target cells.

Figure 10:
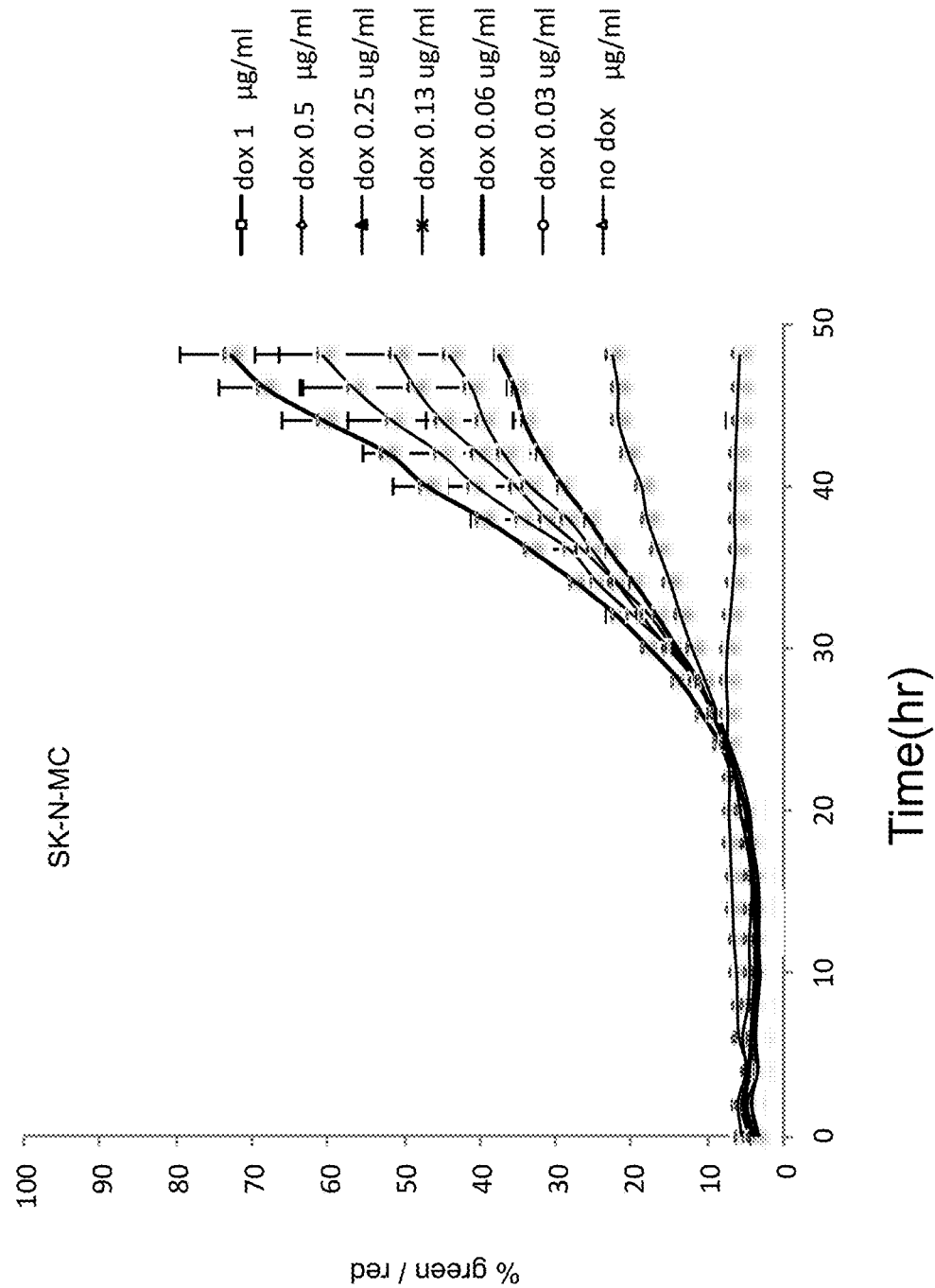
FIG. 10 is a graph showing the effect of secreted FGF2 concentrations on SK-N-MC cells co-incubated with HeLa cells secreting FGF2 inducible by doxycycline on the quotient of red fluorescent nuclei and green fluorescence caused by apoptotic cells.

FIG. 10 shows the effect of secreted FGF2 concentrations on SK-N-MC cells co-incubated with HeLa cells secreting FGF2 inducible by doxycycline on the quotient of red fluorescent nuclei and green fluorescence caused by apoptotic cells. Different doxycycline concentrations were added which is reflected in the quotient of living and apoptotic cells.

Figure 11B:
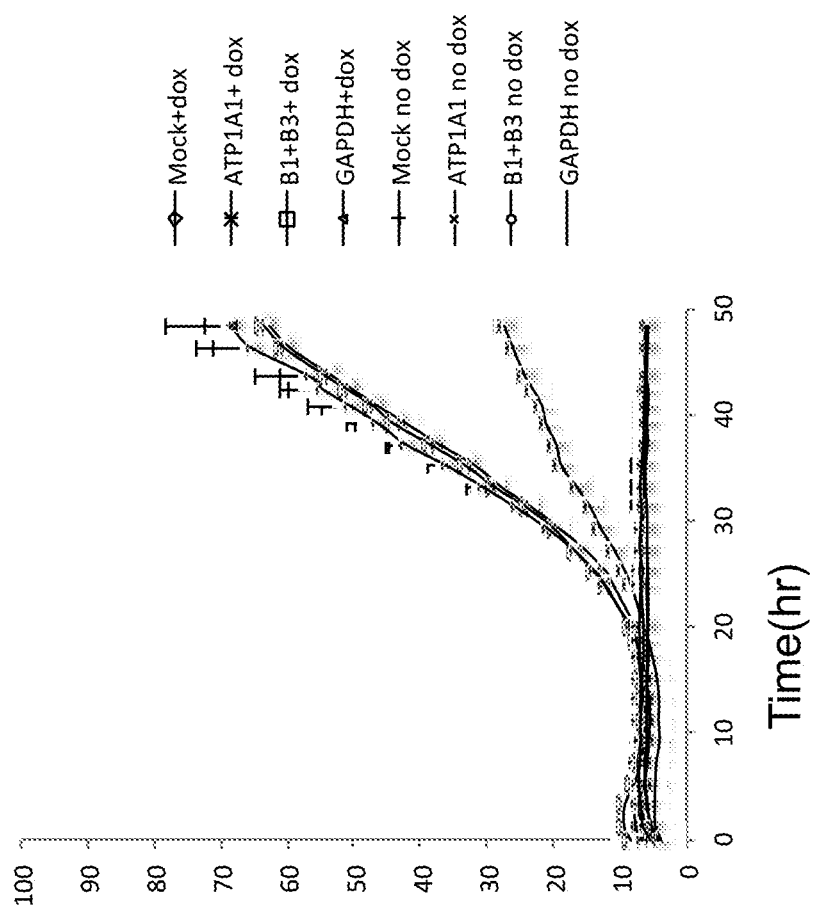
FIGS. 11A and 11B show dependence of quotient of apoptotic cells to living cells on a knock-down of ATP1A1 (positive control; Zacherl et al 2015, J. Biol. Chem.; Legrand et al. 2020, Commun. Biol.) and GAPDH (negative control) in the presence or absence of doxycycline-dependent FGF2 expression.
Figure 11A:
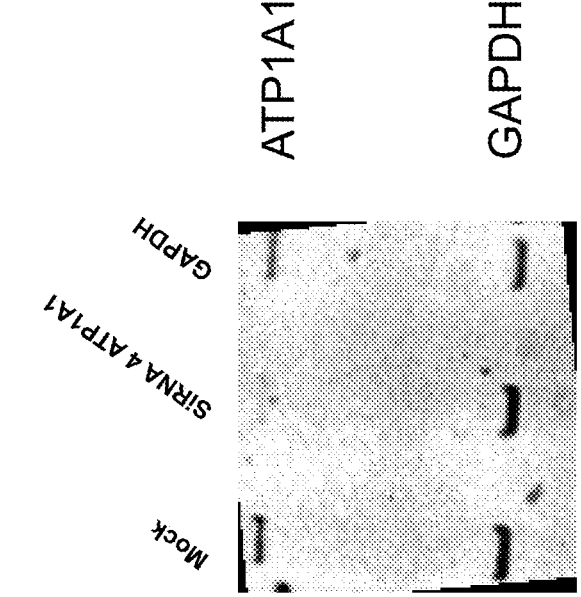

FIGS. 11A and 11B show in FIG. 11A the knock down of ATP1A1 expression and in FIG. 11B the effect of the knock down and GAPDH (control knock-down) and/or doxycycline addition. It was surprisingly possible to detect the knock-down of ATP1A1 by using the assay calculating the quotient of red and green fluorescence caused by living cells (red) and apoptotic cells (green).

Figure 12B:
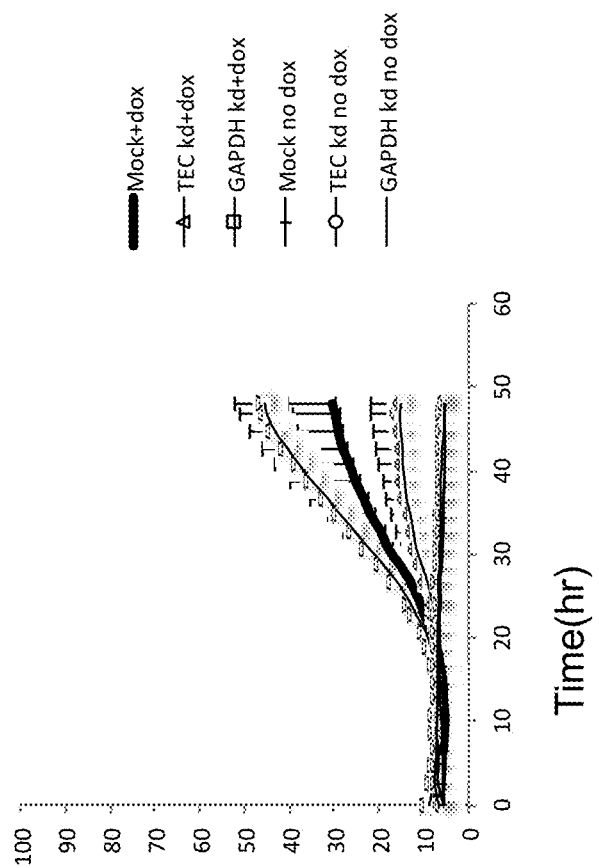
FIGS. 12A and 12B show dependence of ratio of apoptotic cells to living cells from knock-down of Tec kinase (positive control; Ebert et al 2010, Traffic; La Venuta et al 2016, J. Biol. Chem) and GAPDH (negative control) in the presence or absence of doxycycline-dependent FGF2 expression.
Figure 12A:
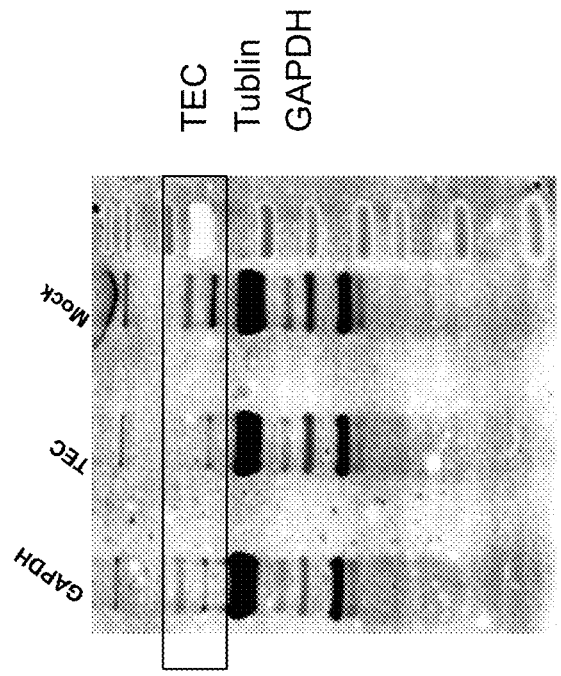
Figure 13:
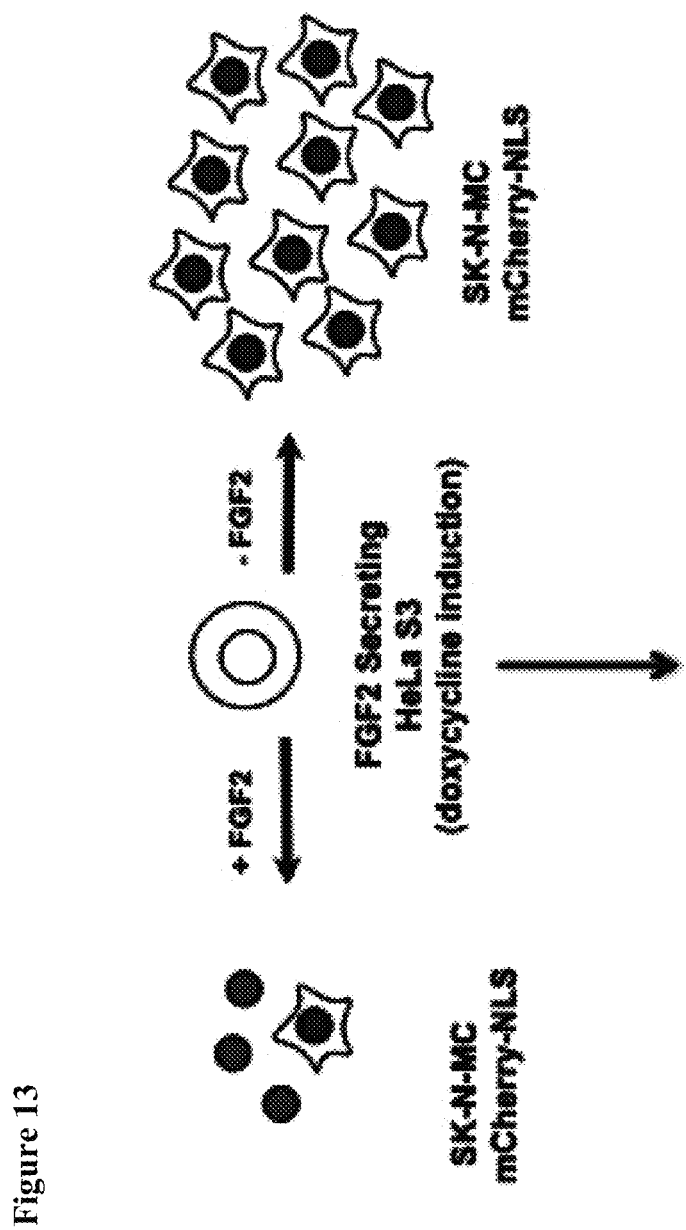
FIG. 13 is a schematic depiction of quantitative assay.

FIGS. 12A and 12B show in FIG. 12A the knock down of Tec-kinase expression and in FIG. 12B the effect of the knock down and GAPDH (control knock-down) and/or doxycycline addition. It was surprisingly possible to detect the knock-down of Tec-kinase as well by using the assay calculating the quotient of red and green fluorescence caused by living cells (red) and apoptotic cells (green).

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

What is claimed is:

1. A method for identifying the presence of FGF2 secretion modulating compounds, the method comprising the steps of:
   a. providing SK-N-MC target cells which become apoptotic in the presence of FGF2, wherein the target cells constitutively express a first reporter exciting fluorescence at a first wavelength, wherein the first reporter is only expressed in the nucleus of living target cells;
   b. monitoring the amount of living target cells by measuring the fluorescence of the first reporter;
   c. detecting the presence of DNA from apoptotic SK-N-MC target cells with a second reporter exciting fluorescence at a wavelength that differs from the wavelength of the first reporter by measuring the fluorescence of the second reporter;
   d. co-incubating the target cells with an FGF2 secreting cell line and a test compound and again measuring the fluorescence of the first reporter and the second reporter;
   e. calculating a quotient by dividing the measured second fluorescence of step (c) by the measured first fluorescence of step (b);
   f. calculating a quotient by dividing the measured second fluorescence of step (d) by the measured first fluorescence of step (d); and
   g. comparing the quotient of step (e) with the quotient of step (f) where a change of the calculated quotient indicates a change in FGF2 secretion and identifies the test compound as an FGF2 secretion modulating compound.

2. The method of claim 1, wherein the second reporter is a second fluorescent protein.

3. The method of claim 1, wherein FGF2 secretion from the FGF2 secreting cell line co-incubated with the SK-N-MC target cells is inducible.

4. The method of claim 1, wherein the co-incubated FGF2 secreting cell line is a HeLa cell line.

5. The method of claim 1, wherein the SK-N-MC target cells are stably transduced with a construct carrying the red fluorescent protein mCherry fused to a nuclear localization signal. (mCherry-NLS).

6. The method of claim 1, wherein the test compound is a member of a compound library, where the members of the compound library are bound to at least one of metal particles, nanoparticles, or a solid phase, and where the members of the compound library comprise peptides, proteins, carbohydrates, antibodies, lipids, micelles, vesicles, synthetic molecules, biological molecules, or polymers.

7. The method of claim 1, wherein the test compound is a member of a compound library and wherein the members of the compound library are in solution.

8. The method of claim 1, wherein the co-incubation of step (d) occurs in a well of a multi-well plate.

* * * * *